United States Patent
Tsantrizos et al.

[11] Patent Number: 6,152,050
[45] Date of Patent: Nov. 28, 2000

[54] LIGHTWEIGHT COMPACT WASTE TREATMENT FURNACE

[75] Inventors: Peter G. Tsantrizos, Westmount; Theodora Alexakis, Ville St-Laurent; Michel G. Drouet, Montreal; Platon Manoliadis, Ville St-Laurent, all of Canada; Edward L. Rademacher, Jr., Silverdale, Wash.; Timothy J. Rivers, Anaconda, Mo.

[73] Assignee: Pyrogenesis Inc., Montreal, Canada

[21] Appl. No.: 09/077,808

[22] PCT Filed: Dec. 10, 1996

[86] PCT No.: PCT/US96/19769

§ 371 Date: Oct. 21, 1998

§ 102(e) Date: Oct. 21, 1998

[87] PCT Pub. No.: WO97/21500

PCT Pub. Date: Jun. 19, 1997

Related U.S. Application Data

[60] Provisional application No. 60/008,621, Dec. 14, 1995.

[51] Int. Cl.$^7$ .............................. F23N 3/00; F23N 5/24; F23J 15/00; F23M 5/00; F23M 5/08
[52] U.S. Cl. ..................... 110/185; 110/203; 110/210; 110/250; 110/259; 110/336
[58] Field of Search ................ 110/165 R, 203, 110/208, 210, 211, 216, 185, 190, 219, 235, 240, 241, 250, 255, 259, 297, 314, 336

[56] References Cited

U.S. PATENT DOCUMENTS

| | | | |
|---|---|---|---|
| 3,741,136 | 6/1973 | Stookey | 110/165 R |
| 4,398,474 | 8/1983 | Berg . | |
| 4,431,612 | 2/1984 | Bell et al. . | |
| 4,479,443 | 10/1984 | Faldt et al. . | |
| 4,579,067 | 4/1986 | Peters . | |
| 4,627,365 | 12/1986 | Tseng . | |
| 4,644,877 | 2/1987 | Barton et al. . | |
| 4,770,109 | 9/1988 | Schlienger . | |
| 4,802,425 | 2/1989 | Dickson . | |
| 4,823,359 | 4/1989 | Ault et al. . | |
| 4,848,250 | 7/1989 | Wunderley . | |
| 4,982,410 | 1/1991 | Mustoe et al. . | |
| 5,000,101 | 3/1991 | Wagner | 110/250 X |
| 5,143,000 | 9/1992 | Camacho . | |
| 5,237,940 | 8/1993 | Pieper et al. . | |
| 5,280,757 | 1/1994 | Carter et al. . | |
| 5,353,720 | 10/1994 | Berg . | |
| 5,451,738 | 9/1995 | Alvi et al. | 110/250 X |
| 5,495,495 | 2/1996 | Cullan . | |
| 5,560,304 | 10/1996 | Duchateau et al. . | |
| 5,579,704 | 12/1996 | Mansur | 110/250 X |
| 5,579,705 | 12/1996 | Suzuki et al. . | |
| 5,606,925 | 3/1997 | Boen et al. | 110/250 X |

OTHER PUBLICATIONS

Calvert et al., "Entrainment Separators for Scrubbers—Final Report", U.S. Environmental Protection Agency, pp. 96–203, Aug. 1975.

*Primary Examiner*—Ira S. Lazarus
*Assistant Examiner*—Ljiljana V. Ciric
*Attorney, Agent, or Firm*—Ware, Fressola, Van Der Sluys & Adolphson LLP

[57] ABSTRACT

A compact furnace having three main chambers. In the first chamber, the water and the organic compounds are dissociated and vaporized and the metals and ceramics are vitrified and transformed into molten slag. A plasma torch or an induction coil can be used to provide the energy required for this operation. In the second chamber, the dissociated and vaporized compounds are burned in air or oxygen using a plasma torch to supplement the energy requirements. The third chamber receives and stores the vitrified slag. The furnace has a lightweight, multi-layered, air-cooled chamber wall construction that incorporates layers of advanced materials to provide both structural integrity at elevated operating temperatures and includes a dynamic cooling control element.

29 Claims, 6 Drawing Sheets

LIGHTWEIGHT COMPACT WASTE TREATMENT FURNACE

This application claims benefit to PCT application serial no. PCT/US96/19769, filed Dec. 10, 1996, which claims benefit to provisional application Ser. No. 60/008,621, filed on Dec. 14, 1995.

TECHNICAL FIELD

This invention relates to a novel design of a lightweight and compact furnace used for the treatment of wastes. Moreover, the invention includes various elements of such design, such as the use of a unique lightweight, multi-layered refractory wall structure which incorporates advanced materials to provide both structural integrity at elevated operating temperatures and high energy efficiency, as well as dynamic cooling control.

BACKGROUND OF THE INVENTION

Navy ships and commercial vessels operate in virtually all of the world's waterways. For the purpose of waste management, these ships can be viewed as small floating cities. Solid wastes surveys conducted aboard U.S. Navy ships indicate that approximately 3.0 pounds (1.4 kilograms) of solid wastes are generated per person per day while at sea. Thus, the people on a typical aircraft carrier generate over 9.9 tons (9 tonnes) of solid wastes per day. Overall, thousands of tons of solid wastes are generated throughout the world's waterways. Presently, the vast majority of these wastes are dumped into the sea, creating significant environmental problems.

In 1987, the United States Senate unanimously ratified an international law which prohibits the discharge of solid wastes into certain "special areas" of the world's oceans. The application of this law extends to all public vessels, including U.S. Navy ships. A congressional provision in 1993 established a deadline of Jan. 1, 2000, for the U.S. Navy surface fleet to meet this requirement.

Presently, the U.S. Navy needs a waste treatment facility which can be installed on board ships. The facility must be lightweight, compact, and modular, so that it can be transported in and out of ships without the need to modify the ship's basic design. Furthermore, the facility must offer high energy efficiency and quick startup or shut-down potential. The technology, disclosed herein, meets all the needs of the U.S. Navy. However, the disclosed technology can also be used for any application where weight and size must be kept to a minimum, such as in transportable or mobile waste destruction systems.

One of the most versatile technologies for the destruction of solid wastes is thermal treatment. Thermal treatment can be accomplished either by incineration or by pyrolysis.

In incineration, the solid wastes are essentially burned in an oxygen rich environment. The combustible constituents of the wastes, such as paper, plastics and other organic compounds, are used as the fuel, with additional hydrocarbon fuels added as needed to maintain a sufficiently hot flame. Typically, incineration is characterized by very large furnaces, incomplete combustion, the generation of polluting emissions, such as dioxins, and the generation of ashes. As such, conventional incineration is not a practical technology for use as a light, compact facility that must generate no detectable emissions.

A number of inventors have described incineration technologies which are specifically aimed at making the systems more compact and efficient. U.S. Pat. No. 5,353,720 describes an incineration system which uses pressurized oxygen and hydrogen, instead of the conventional air and either gas or oil, to create a flame temperature within the chamber of at least 4,000° F. (2,250° C.). The burning of oxygen and hydrogen significantly reduces the amount of gas needed and therefore, the size of the unit. Furthermore, by burning at extremely high temperature, the polluting emissions in the off-gas are dramatically reduced. However, one may expect that this type of operation is extremely dangerous and the risk of explosions may hinder the commercial use of this technology. Additionally, large amounts of hydrogen and oxygen must be available for operating this type of furnace.

Other incineration based technologies are described in U.S. Pat. Nos. 4,627,365 and 4,579,067, respectively. U.S. Pat. No. 4,627,365 describes a portable incineration facility which is installed onto the truck that also collects municipal garbage. This type of incineration is designed to process very small quantities of solid wastes and it is doubtful that this approach will offer satisfactory waste destruction and clean off-gas emissions. U.S. Pat. No. 4,579,067 describes an incinerator design which offers higher combustion temperatures in an effort to reduce the emission of polluting compounds. All incineration furnaces produce fly ash which is both toxic and difficult to handle and which must either be land-filled or further processed.

Other incineration type furnaces include those described in U.S. Pat. Nos. 4,479,443 and 4,848,250, respectively. Both of these technologies use incineration coupled with an additional energy source in an effort to improve the performance of the furnace. U.S. Pat. No. 4,479,443 describes a furnace which uses both a plasma and a combustion flame to destroy PCB's. The plasma is used to increase the combustion temperature and, thus, increase the destruction efficiency of the PCB's to greater than 99.99%. In U.S. Pat. No. 4,848,250, an induction coil is used to maintain a molten metal bath into which the solid wastes are dropped and treated. This system, which combines induction and incineration, offers the ability to both combust the wastes at higher temperatures, thus, reducing the polluting emissions in the off-gas, and vitrify the fly ash.

In pyrolysis, the waste is exposed to heat in excess of 1,000° F. (540° C.) in an oxygen deficient environment. Electrical energy, such as that transferred by plasma jets, arcs and induction furnaces, are used as the sources of heat. The water in the wastes vaporizes and the organics dissociate to form simpler volatile compounds, such as $H_2$ CO, $CO_2$, and $C_2H_2$. The remaining materials, mostly ash, glass and metals, can be heated further to temperatures in the order of 3,500° F. (1,930° C.) to melt and vitrify into a slag, which has been shown to be extremely stable and to possess no environmental threats. In fact, vitrified slag is so stable that it is considered the most accepted method of storing even the most dangerous materials, such as nuclear wastes. The off-gas, containing all the dissociated volatile compounds must be treated further to prevent any toxic emissions. Typically, this treatment involves combustion for 2 seconds at a minimum of 2,000° F. (1,095° C.). Air or oxygen are used for combustion. A hydrocarbon fuel is used to ensure that the temperature is maintained above 2,000° F. (1,095° C.).

A number of pyrolysis furnaces have been designed and patented over the past two decades. In one design, developed by Retech Inc. (U.S. Pat. No. 4,770,109), a plasma torch is used to supply the energy for pyrolysis. Air is used as the plasma forming gas. The entire furnace is rotated, causing the molten wastes to spread out over the surface of the furnace. By spreading out the molten wastes, the surface area available for treatment is increased and Retech claims that the quality of the treatment is enhanced. The vitrified slag is tapped through a hole located at the center of the rotating furnace by reducing the turning velocity, and the associated centrifugal force, and allowing the slag to flow into the hole.

Another plasma pyrolysis furnace is described in U.S. Pat. No. 5,143,000 awarded to Plasma Energy Corporation (PEC). In the PEC furnace the solid wastes are fed into the furnace forming a column. The plasma torch is inserted into the lower portion of the column having the plasma emitting end surrounded by the wastes. The height of the column is maintained at a level above the plasma torch. The energy of the plasma is used to dissociate the organic compounds in the mixed wastes and to melt the ash and the metals into a slag. The volatile organics leave through the top of the furnace, while the slag is removed from the bottom. In the PEC furnace both the plasma torch and the furnace wall are fixed and any movement is a result of momentum transferred to the wastes by the plasma jet. However, a movement for the torch, such as the one described for a graphite arc electrode in U.S. Pat. No. 4,982,410, presumably could be introduced, if required.

U.S. Pat. No. 5,280,757 also describes a plasma pyrolysis furnace similar to the Retech furnace and the PEC technologies but does not offer details of the design. This patent claims a process in which a plasma arc is used inside a refractory lined furnace to heat Municipal Solid Wastes (MSW) to temperatures in excess of 2,010° F. (1,100° C.). The entry of air into the furnace is minimized in an apparent effort to produce an off-gas with a higher heating value. In pyrolysis, the off-gas contains enough hydrogen and hydrocarbons to burn it and recover approximately 250 Btu/ft$^3$ (9,315 kJ/m$^3$) of gas.

All the furnaces described in the above mentioned patents, whether they use incineration or pyrolysis, use conventional refractory liners to cover the inner surface of the furnace and prevent both excessive heat loss and damage to the structural walls. Furthermore, these designs must always be accompanied by a Secondary Combustion Chamber (SCC) for the treatment of the off-gas. Typically, the inner surface of the SCC must also be covered with conventional refractory liners. Conventional liners, even those made from advanced materials such as those developed by Norton Company and described in U.S. Pat. No. 4,823,359, add tremendously to the weight of the furnace and the SCC. For example, plasma furnaces, such as those described in U.S. Pat. Nos. 4,770,109 and 5,143,000, respectively, operating at 500 kW and able to treat about 700 lb/hr (320 kg/hr) of solid wastes, combined with a suitable SCC system, would need enough refractory to cover approximately 200 ft$^2$ (19 m$^2$) of furnace wall. If energy losses as high as 20% are acceptable, the thickness of the conventional zirconia refractory wall would be approximately 12 inches (30 cm), and the furnace and SCC would require almost 40 tons (44 tonnes) of refractory. If lower losses are desired, the refractory wall would have to be thicker and heavier. Another problem with the use of conventional refractory lined furnaces is the long time required for heat-up and cool-down of the furnace during start-up and shut-down.

The amount of refractory needed can be reduced significantly if the furnace operation does not require the use of a SCC. In U.S. Pat. No. 4,644,877, a spray ring is used to quench and clean the off-gas created from the plasma dissociation of wastes. In U.S. Pat. No. 5,579,705, the off-gas from the plasma furnace is treated by flowing co-currently with the slag generated in the furnace. In both of these technologies, the treatment of the off-gas is aimed at the elimination of a SCC system. However, neither of the technologies described in these patents is considered to offer adequate treatment, and in most applications, U.S. law requires the use of a SCC system.

The best way to avoid the added bulk and weight of the furnace, contributed by the refractory lining, is to use a lighter energy management system. The development of an improved refractory wall has been the focus of many technologies. For example, U.S. Pat. No. 4,802,425 describes a refractory lining which consists of alternating strips of two fibrous materials. The first fibrous material is chosen for its shrinkage or corrosion resistance while the second material is chosen for its superior mechanical strength. While this type of design may offer improved performance in highly corrosive environments, it is not obvious that it will significantly reduce the bulk or the weight of the lining.

A structure for insulating furnaces, which does not use conventional refractory materials, is described in U.S. Pat. No. 4,398,474. This structure consists of a shell, enclosing a series of refractory, substantially parallel, spaced-apart sheets, one or more of which is reflective. The insulating wall is designed to work by reflecting part of the radiation from the hot surface back to the heat source, thereby reducing heat losses. This structure appears to be based on a theoretical study and leaves many unanswered practical questions. For example, the patent does not specify any materials that may be used to obtain the desired properties. In fact, the described structure seems more suitable for use in relatively low temperatures (about 1,000° F. or 540° C.) and for containing the heat generated by a clean energy source. To the knowledge of the present inventors, no such insulating structure has ever been used for wastes treating furnaces.

An issue which must be considered in designing a lightweight furnace wall for use in waste-treating furnaces relates to the large variations in the composition of the feed materials. Some wastes contain large amounts of organics which, when combusted, release tremendous amounts of energy. Other waste feeds contain little or no organics and, therefore, their treatment results in minimum energy production. Since the organic content of the feed can change constantly, the energy input to the furnace wall changes, and the cooling rate of the wall must vary accordingly in order to maintain a constant wall temperature. This issue is particularly important for walls designed to heat up and cool down rapidly and which, therefore, must store minimum energy, as compared to conventional refractory walls that store a huge amount of energy and can stay hot despite temporary reductions in the heat released within the furnace.

SUMMARY OF THE INVENTION

The furnace, described herein, is intended for use in the treatment of mixed solid wastes, biomedical wastes, hazardous wastes and old munitions, in situations where low weight, small volume and modularity are required, such as on board of ships, on trailers, and the like. The lightweight, compact furnace is capable of converting the organic component of the wastes into a benign gaseous discharge and the inorganic materials into an inert, vitrified solid product (slag), suitable for disposal or use as a construction material.

The furnace, disclosed herein, consists of three main chambers; (i) the Primary Solid Treatment Chamber (PSTC), used to dissociate and vaporize the organic components and vitrify the inorganic components, (ii) the Secondary Combustion Chamber (SCC) used to assure the complete combustion and treatment of all volatile compounds generated in the PSTC, and (iii) the slag processing and storing chamber. In essence, therefore, the furnace of the present invention comprises:

(a) a primary solid treatment chamber containing a crucible in which the wastes are transformed into molten slag and simple volatile components;

(b) a secondary combustion chamber in which volatile compounds generated in the primary solid treatment chamber are further treated to insure complete combustion thereof; and (c) a slag processing and storing chamber in which the slag formed in the crucible of the primary solid treatment chamber is cooled and transported for removal from the furnace;

(d) wherein the walls of said primary solid treatment chamber and of said secondary combustion chamber comprise an inner wall structure made of a metal having good mechanical properties at high operating temperatures, one side of said inner wall structure facing a hot chamber interior and at the other side there is provided a gap through which variable cooling air may be passed so as to produce a dynamic controlled cooling of said inner wall structure, said walls also having an outer steel shell following said gap. The variable cooling air passing through the gap may be produced, for example, by varying the speed and/or amount of the cooling air and this may be adjusted or controlled (for example by CPU valves and variable speed blowers) as a function of the inner wall temperature on the side of the gap, which temperature may be measured by means of thermocouples.

Depending on the temperatures and other conditions existing in the hot chamber interior, the inner wall structure could be made, for example, of stainless steel or, preferably, of a superalloy which may be provided with a thermal barrier coating on the side facing the hot chamber interior, and possibly with a bond coat made of a corrosion and oxidation resistant material and used for bonding said thermal barrier coating to the superalloy or other suitable metal used to form the inner wall structure.

Usually, both the PSTC and the SCC are powered by plasma generating devices and, depending on requirements, may actually be joined into one larger vessel. The slag processing chamber is not exposed to the plasma environment and operates at much lower temperatures.

The PSTC plasma generating device can be a plasma torch, operated in either transferred or non-transferred mode (transferred mode implies that the plasma arc is attached on one end to the electrode in the torch and on the other end to the molten slag pool, whereas non-transferred mode implies that both arc attachment electrodes are inside the plasma torch). In another embodiment of the invention, an induction coil is used to provide the power needed in the PSTC.

The solid wastes are preferably pre-treated (for example, the wastes may be sized by shredding or otherwise treated by conventional technologies) and fed into the PSTC section of the furnace by a conveyer or screw feeder. Within the PSTC, the mixed wastes are received into a crucible made of an electrically conductive material, such as copper, which may be water or air cooled and where they are heated to temperatures above 2,800° F. (1,540° C.). Generally, a plasma torch able to operate in both transferred and non-transferred mode is used to heat the wastes in the crucible. Air is used as the plasma forming gas, but either oxygen or nitrogen may also be used. Induction heating may also be used as the source of energy.

Within the crucible: (i) the water contained in the wastes is quickly vaporized; (ii) the organics are dissociated into relatively small volatile molecules, such as $H_2$, CO, $CO_2$, and $C_2H_2$; and (iii) the inorganic components, such as glass and metals, are melted, mixed and oxidized, forming a molten ceramic pool which upon cooling solidifies into a very stable slag. Mixing the molten pool in the crucible is accomplished by the impingement of the plasma jet on the surface of the molten pool, and by moving the plasma torch, and consequently the jet impingement, anywhere on the surface of the crucible, using a three-axis hydraulically assisted mechanism. In the case where induction heating is used as the source of energy for melting the slag, magnetic stirring occurs in the melt and it produces the required mixing of the molten pool.

Periodically, the crucible is lowered, from its normal operating position within the PSTC to the slag processing and storing chamber which is located directly below the PSTC, and tilted to pour the molten slag into small molds located on a conveyer. Alternatively, an induction plug may be used to open a hole at the bottom of the crucible through which the molten slag can be poured into the molds. As the molds fill with the molten slag, the conveyer moves so that the next mold is in position to receive the molten slag. Eventually, the conveyer moves the molds into a cooler section of the furnace where the slag solidifies and is stored.

The volatile molecules leaving the molten crucible are partially oxidized and treated in the PSTC where the gas temperature is maintained at approximately 2,000° F. (1,095° C.) and air or oxygen, fed into the PSTC as the plasma forming gas or through holes in the furnace walls, is available for combustion. The treatment of these molecules is completed in the SCC. Within the SCC, the volatile molecules are burned completely at a temperature of approximately 2,000° F. (1,095° C.). A residence time in excess of 2 seconds is normally provided to ensure complete combustion. A plasma torch operated in a non-transferred mode is used to ensure that the temperature does not drop below the specified limits. Air or oxygen is fed into the SCC for combustion of the volatile compounds in two ways: (i) through the plasma torch, as the plasma forming gas, and (ii) through orifices in the wall of the SCC. Alternatively, excess air may be added to the PSTC, thus reducing or eliminating the need for additional air in the SCC.

One of the most innovative elements of the lightweight, compact furnace is the elimination of refractory lining as a wall structure for the hot furnace interior. The walls of both the PSTC and the SCC are made of two layers of materials. The first layer, i.e. the inner wall structure, which is facing the hot combustion zone, may be made, for example, of nickel based superalloys, such as those developed by the aerospace industry for application in the hot sections of jet engines. The superalloys may be coated on their hot surface first with a corrosion and oxidation resistant material such as cobalt-nickel-chromium-aluminum based alloy (commonly known as the CoNiCrAlY bond coat), and then with a thermal barrier coating, such as partially stabilized zirconia or other ceramic thermal barrier coating (TBC) suitable to the operating environment of the furnace. The bond coat and the TBC are very thin, and do not normally exceed 0.08 inches (0.2 cm) in total thickness, compared to conventional refractory liners which are typically 12 inches (30 cm) thick. Yet, they enhance the stability and durability of the superalloy inner wall, which operates in the temperature range of 1,300–1,600° F. (705–870° C.). Since the inner wall is exposed to the high temperature of the furnace, the superalloy must be selected from materials which offer good mechanical properties and good corrosion resistance at the operating conditions.

The second layer or portion of the furnace wall, located on the cool side of the inner wall structure, comprises a cooling air gap and an outer steel shell. It may also include a layer of ceramic fiber insulating material, such as Fiberfrax, between the air gap and the steel shell. Ceramic fiber insulations offer exceptionally low thermal conductivity, (approximately 0.5 Btu/(hr·ft$^2$)(° F./in) [0.72 J/(s)(m)(° C.)], compared to over 10 Btu/(hr·ft$^2$)(° F./in) [1.4 J/(s)(m)(° C.)] for conventional refractory liners) and low density (approximately 10 lb/ft$^3$ or 160 kg/m$^3$), compared to about 450 lb/ft$^3$ (7,200 kg/m$^3$) for conventional refractory liners). However, ceramic fiber insulation cannot be used directly as a liner in furnaces due to its poor mechanical properties and potential corrosion problems. In the present application, the fiber insulation sees only reduced temperatures (due to the existence of the inner wall structure and the cooling air gap), does not come in contact with any of the contents in the furnace and is not exposed to the potentially corrosive furnace environment.

The cooling air gap which is normally a thin gap, of approximately 0.5 inches (1.3 cm), is mainly used to provide dynamic controlled cooling of the inner wall structure, but it may also be used to feed air or oxygen to either or both the PSTC and the SCC. The air, or oxygen, passes through the gap, cooling the inner wall structure and the ceramic fiber insulation when it is present as part of the wall construction. The hot air may then be fed into the reactor through one or a number of orifices in the inner wall structure and may be used in the combustion process or released directly to the environment. Thus, the air could serve four purposes: (i) cool the walls of the furnace; (ii) provide the oxygen needed for the combustion of the volatile molecules; (iii) increase the thermal efficiency of the furnace by converting the furnace cooling system into a process air preheating system; and (iv) remove excess heat from the furnace.

A very important characteristic of the furnace wall design, disclosed herein, is the ability to start-up and cool-down in a very short time. The walls of the furnace, both in the PSTC and the SCC sections, must be hot in order for the furnace to operate properly. In conventional refractory lined furnaces, preheating the furnace may require as much as 6 hours. Furthermore, once the treatment of the wastes has been completed, if one must open the furnace for cleaning or maintenance, many hours of cooling are needed to remove the heat stored inside the refractory lining. The lightweight, compact furnace described herein can be preheated within a few minutes since the inner wall temperature can be increased to normal operating temperatures almost instantly. Cooling down the furnace can also be accomplished within minutes by using the process air to cool the inner wall.

Figure 2:
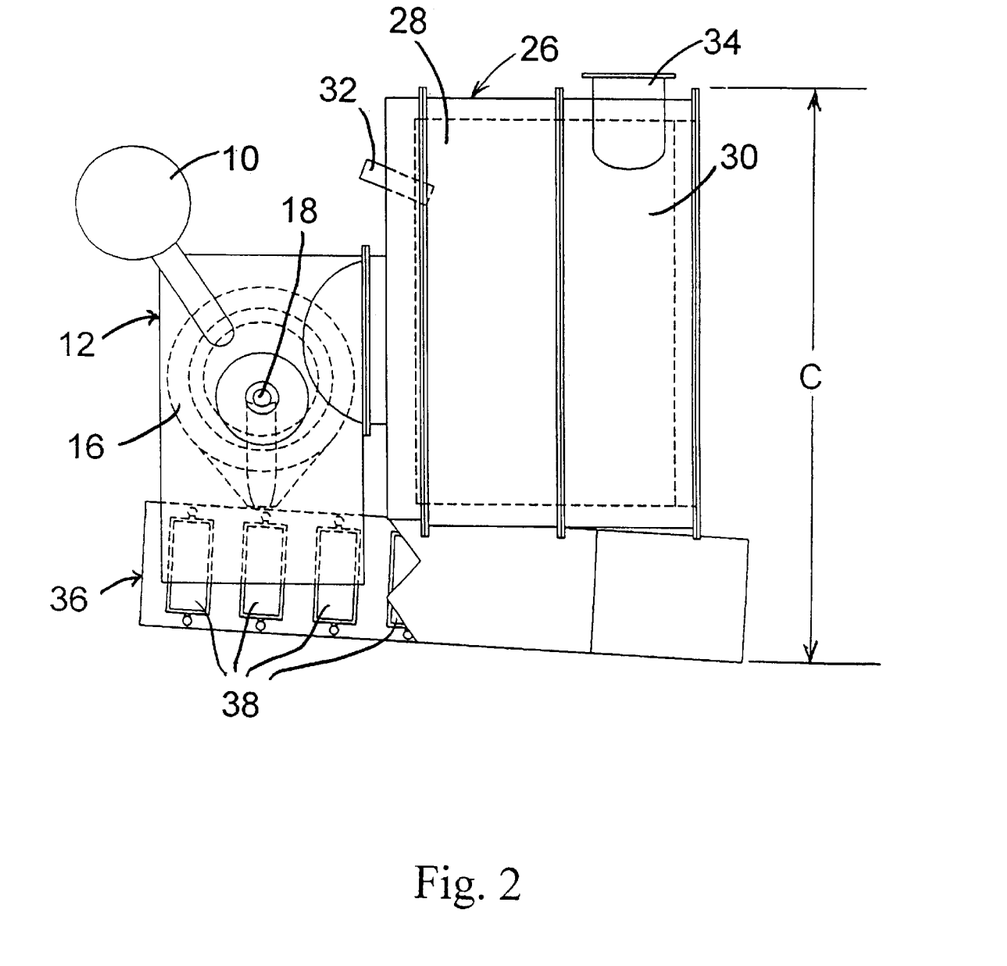
FIG. 2 is a schematic top view of the design shown in FIG. 1.

Another important characteristic of the disclosed furnace is its modularity. A lightweight, compact furnace capable of treating 675 lb/hr of mixed wastes, generates about 1,200 standard cubic feet per minute (scf/min or 0.6 m$^3$/s) of off-gas and requires a gas treatment system whose volume is over 150 ft$^3$ (4.2 m$^3$). If the installation of this furnace is inside a ship, it would require significant damage to the ship's infrastructure during installation. In the disclosed furnace, the PSTC, the slag processing, and the SCC sections are fabricated in a number of modules which can pass through the standard ship doors without any modifications. Once inside the ship, the modules as illustrated, for instance, by sections a, b, c, d, and e shown in FIG. 2 are assembled to provide the required treatment volume.

In summary, the furnace, disclosed herein, offers a number of important innovations and advantages: (i) it is lightweight due to the introduction of a unique wall energy management system; (ii) it is compact due to the use of plasmas or induction both in the primary (solids treating) and in the secondary (gas treating) sections and avoiding the use of hydrocarbon fuels which dramatically add to the volume of the off-gas; (iii) it is highly efficient due to the potential conversion of the wall cooling system into the air preheating system; (iv) it is modular so that it can be installed without requiring any modifications to the installation site; (v) it can be preheated and cooled-down very rapidly due to the elimination of the conventional refractory liner which stores a great amount of energy; and (vi) the wall can be maintained at a substantially constant temperature, despite variations of the heat released inside the furnace, by using the dynamic wall cooling system.

The present invention also includes the novel lightweight wall construction that may be used for any furnace having a hot chamber interior.

BRIEF DESCRIPTION OF THE DRAWINGS

The invention will now be described with reference to the appended drawings in which.

DETAILED DESCRIPTION OF THE INVENTION

Figure 1:
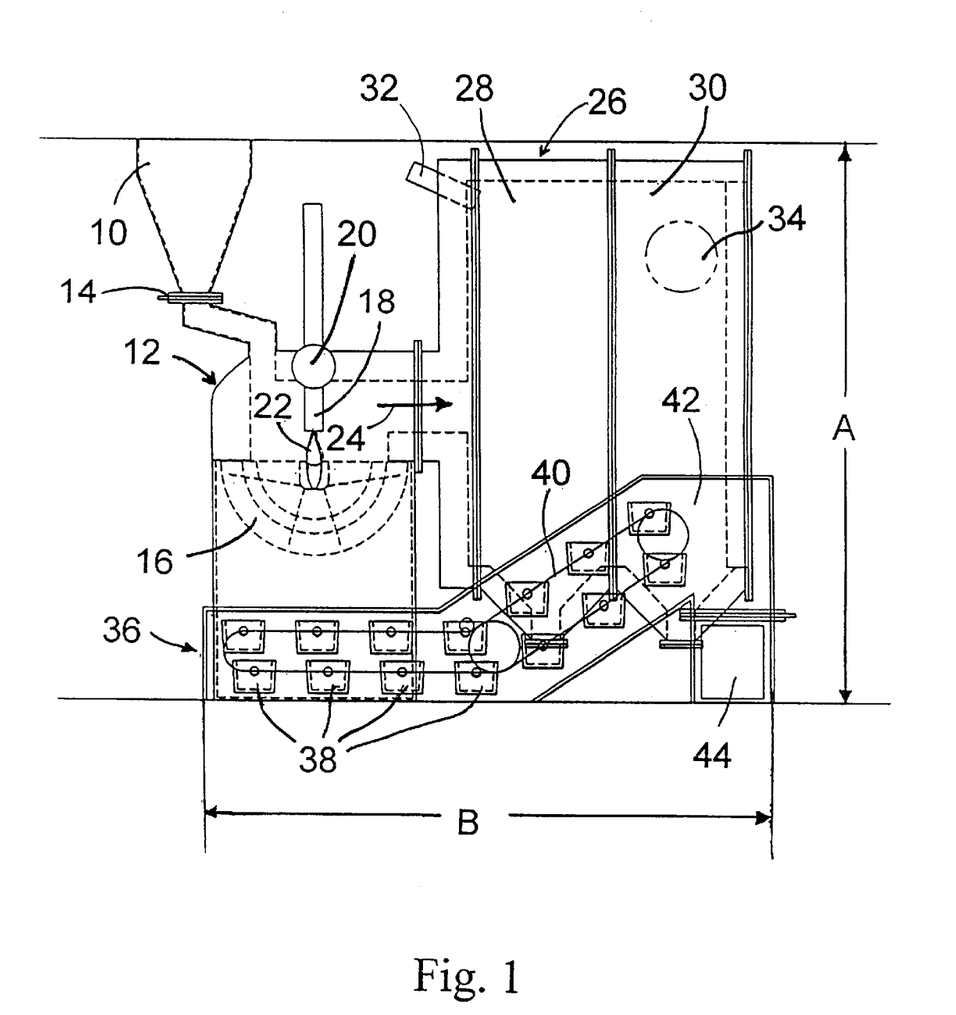
FIG. 1 is a schematic side view of a furnace design in accordance with an embodiment of the present invention.

Referring to FIG. 1 and FIG. 2, they show a side view and a top view respectively of a lightweight compact furnace for the treatment of wastes having a hopper 10 into which the wastes are loaded and from which they pass to the primary solid treatment chamber (PSTC) 12. The passage of the wastes can be enhanced by means of a vibratory pan conveyer 14.

The PSTC 12 has a crucible 16 into which the wastes are conveyed from the hopper 10 and where they are melted using a plasma melting torch 18. Crucible 16 is usually water-cooled. The plasma melting torch 18 can be pivoted as required through pivot 20 so as to provide satisfactory mixing within the crucible 16. In lieu of torch 18, an induction coil (not shown) may be used to provide the power needed in the PSTC 12 to heat the wastes in the crucible to temperatures above 2,800° F. (1,540° C.) thereby vaporizing the water contained in the wastes, dissociating the organics into molecules such as $H_2$, $CO$, $CO_2$ and $C_2H_2$ and mixing and melting the inorganic components, such as glass and metals, into a very stable slag. The mixing is accomplished by impingement of the plasma jet 22 on the surface of the molten pool in the crucible 16 and the moving of the plasma torch 18 through the pivot 20 anywhere on the surface of the crucible using a three-axis pivoting mechanism which may be hydraulically assisted.

The gases produced in PSTC 12 flow through the passage as shown by arrow 24 into the secondary combustion chamber (SCC) 26 which may be formed of one or more secondary combustion sections 28, 30. The number of such sections depends on the overall size of the furnace and its capacity of waste treatment. In the illustrated embodiment two such sections are shown.

Plasma torch 32 is used to heat the gases in the SCC 26 to temperatures in excess of 2,000° F. (1,095° C.) thereby ensuring complete combustion. Air or oxygen is also fed into the SCC for combustion of the volatile compounds, which is accomplished through the plasma torch and through orifices in the wall of SCC as will be described later. off-gases are removed through the opening 34.

The water-cooled crucible 16 is periodically lowered from its operating position within the PSTC 12 to the slag processing and storing chamber 36 which is located below the PSTC. The crucible is then tilted to pour the molten slag into small molds 38 located on a conveyer 40. The molds are filled with slag one after the other and eventually move into a cooler section 42 where the slag solidifies and from which it is removed by door 44.

In the present example, the height A of the furnace is 74" (1.85 m), its base length B is 53" (1.325 m) and its base width C is 37" (0.925 m) for a volume of 84 ft$^3$ (2.27 m$^3$).

Figure 3:
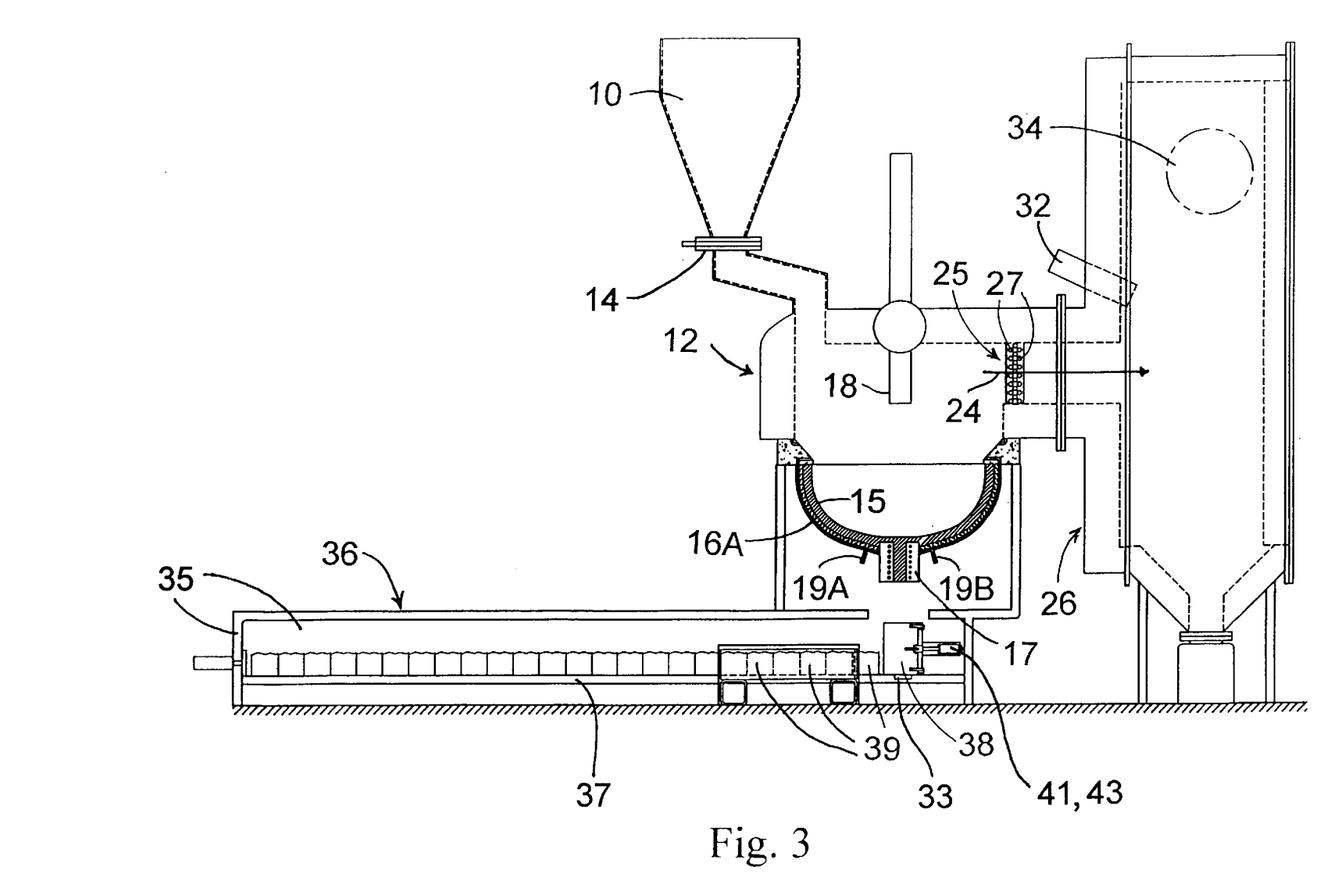
FIG. 3 is a schematic side view of a furnace design in accordance with another embodiment of the present invention.

In FIG. 3 another embodiment of a furnace according to the present invention is illustrated, where the same elements shown in previous figures are identified by the same reference numbers. As shown in this FIG. 3 the wastes are loaded through hopper 10 and feeder mechanism 14 into a primary solid treatment chamber (PSTC) 12 provided with crucible 16A which, in this embodiment, is a stationary crucible. This crucible 16A is equipped with an induction plug 17 for pouring the slag into molds 38. The primary plasma torch 18 may be a dual mode torch capable of operating in non-transferred and transferred modes. Operation of the torch in the transferred mode, using the molten bath as the anode, is very desirable since this mode of operation has a very high torch efficiency, typically about 90%. However, during start up, the solidified slag is not electrically conductive, thus non-transferred operation is required. The primary plasma torch 18 permits conversion from non-transferred to transferred mode by connecting the torch nozzle and the melt to the power supply in parallel and opening the contact to the torch to transfer the arc.

The gases produced in PSTC 12 flow through the passage as shown by arrow 24 into the secondary combustion chamber (SCC) 26. A high temperature arrester 25 may be included in the passage 24 to prevent any large particles entrained in the off-gas from leaving the PSTC 12. This arrester 25 acts as a filter of such large particles and is normally formed of a cylindrical element with several rows of staggered rods 27 mounted therein. The entire arrester 25, including the rods 27, are made of a material having good thermal shock resistance at high temperatures, such as silicon carbide. SCC 26 has a secondary plasma torch 32 to heat the gases to a desired temperature such as to ensure complete combustion. Off gases are removed through opening 34.

The crucible 16A in this embodiment is a half-ellipsoid crucible having a circular cross-section. The shell of the crucible can be made of a material such as copper backed stainless steel or nickel. A crucible wall 15 is provided within the crucible, such that there is a passage between said wall 15 and the outside shell of the crucible.

This crucible is air cooled by injecting process air through inlets 19A, 19B; air outlets are provided in the upper part of the crucible. A porous metallic packing may also be provided within the passage to promote heat transfer from the crucible wall to the air. Tests have shown that in this manner 260 scfm of air can remove 22,200 Btu/hr.ft$^2$ (70 kW/m$^2$) of energy from the crucible, thus cooling the surface of the crucible to 930° F. (500° C.).

Figure 3A:
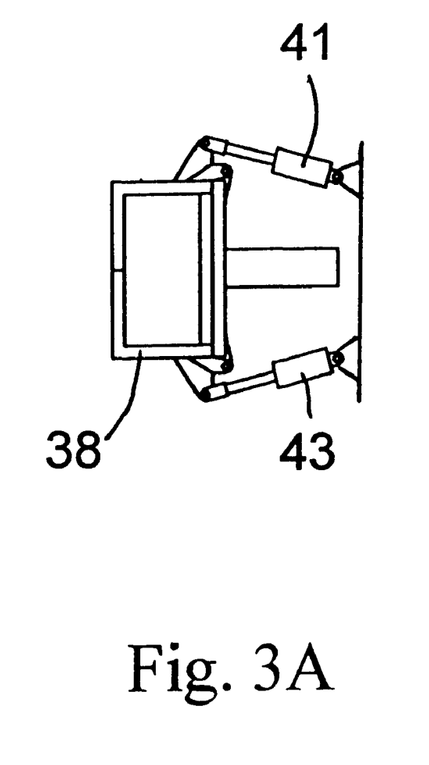
FIG. 3A is a top view of a mould for receiving molten slag showing the mould in closed condition.
Figure 3B:
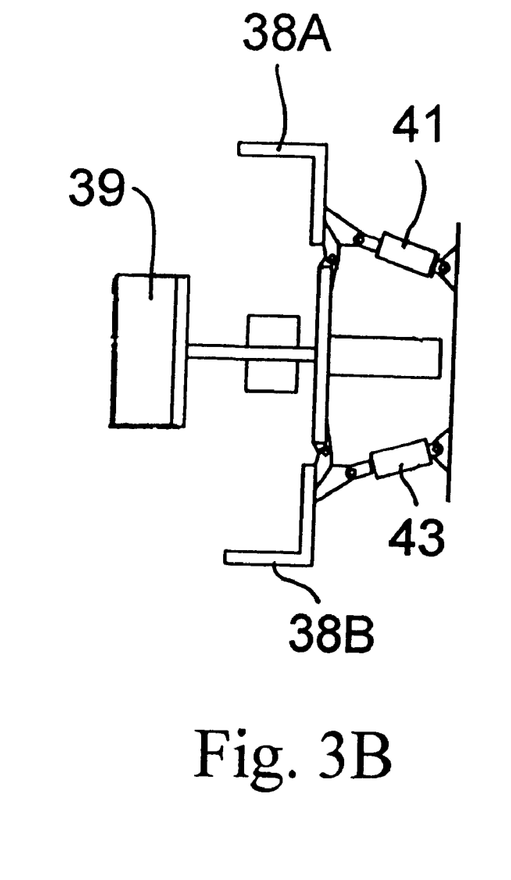
FIG. 3B is a top view of the mould shown in FIG. 3A, in open condition.

The slag processing chamber 36 is essentially a water-cooled rectangular chamber where the slag ingots are allowed to cool for approximately 10 hours. The molten slag is poured via the induction plug 17 into a mold 38 located below the plug. Slag may be so poured into a mold every 12 minutes. The weight of each ingot is controlled by a compensated load cell 33, so as to ensure that the ingot will not exceed a predetermined weight, e.g. 50 lb. The mold 38 may be formed of two halves which can be closed as shown in FIG. 3A or which can be separated into halves 38A and 38B as shown in FIG. 3B. Slag is allowed to cool in such mold for about 10 minutes before the two halves of the mold are pulled apart by hydraulic pistons 41, 43 to free the ingot 39 from the mold. Once the ingot is so freed it is pushed through the cooling chamber 36 and will finally end up on a pallet which holds a plurality of such ingots 39 and from which they can then be removed as required. The chamber may have not only water-cooled side walls 35, but also a water-cooled bottom 37, which will decrease the time required for cooling.

Figure 4:
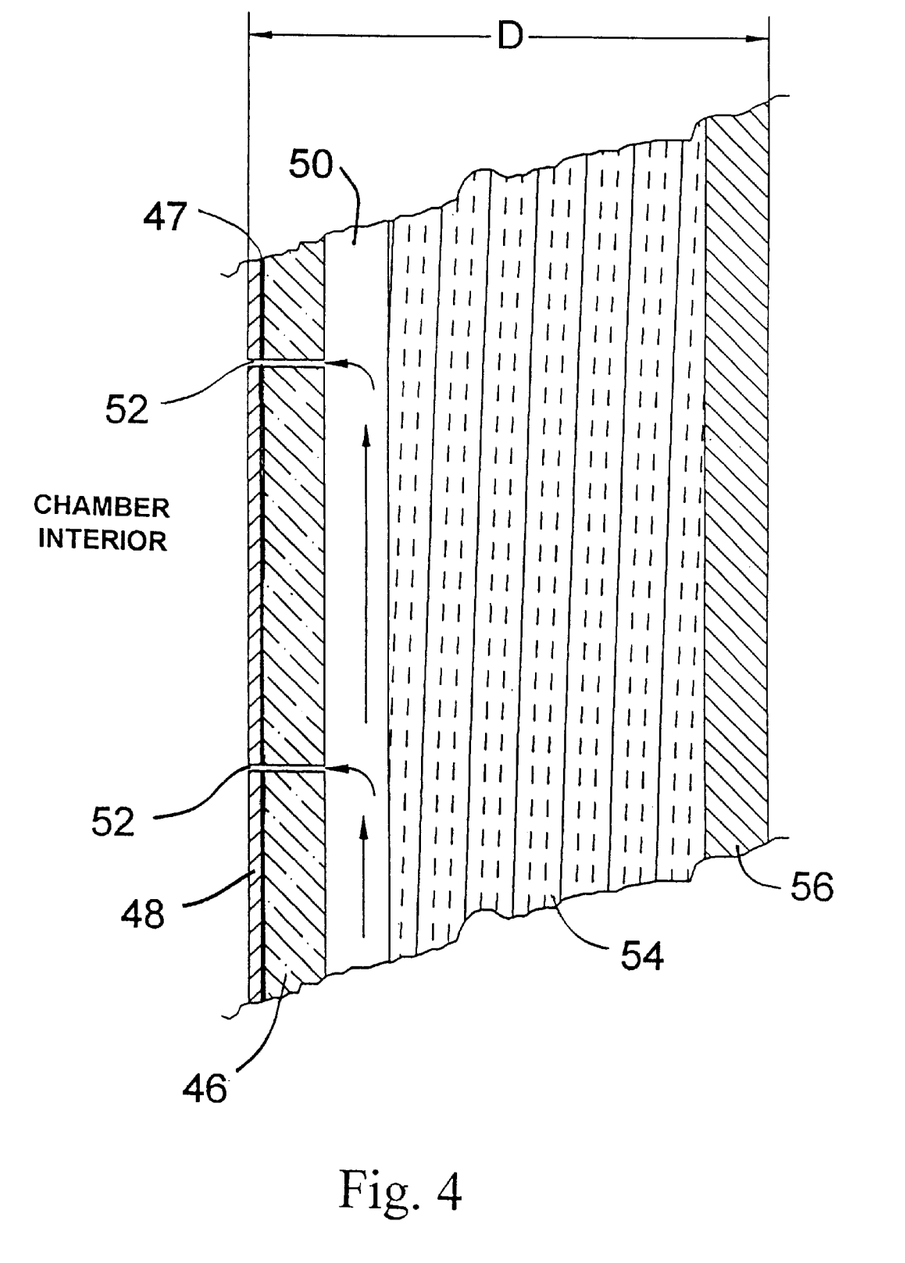
FIG. 4 is a section view of a lightweight wall suitable for the furnace of the present invention.
Figure 5:
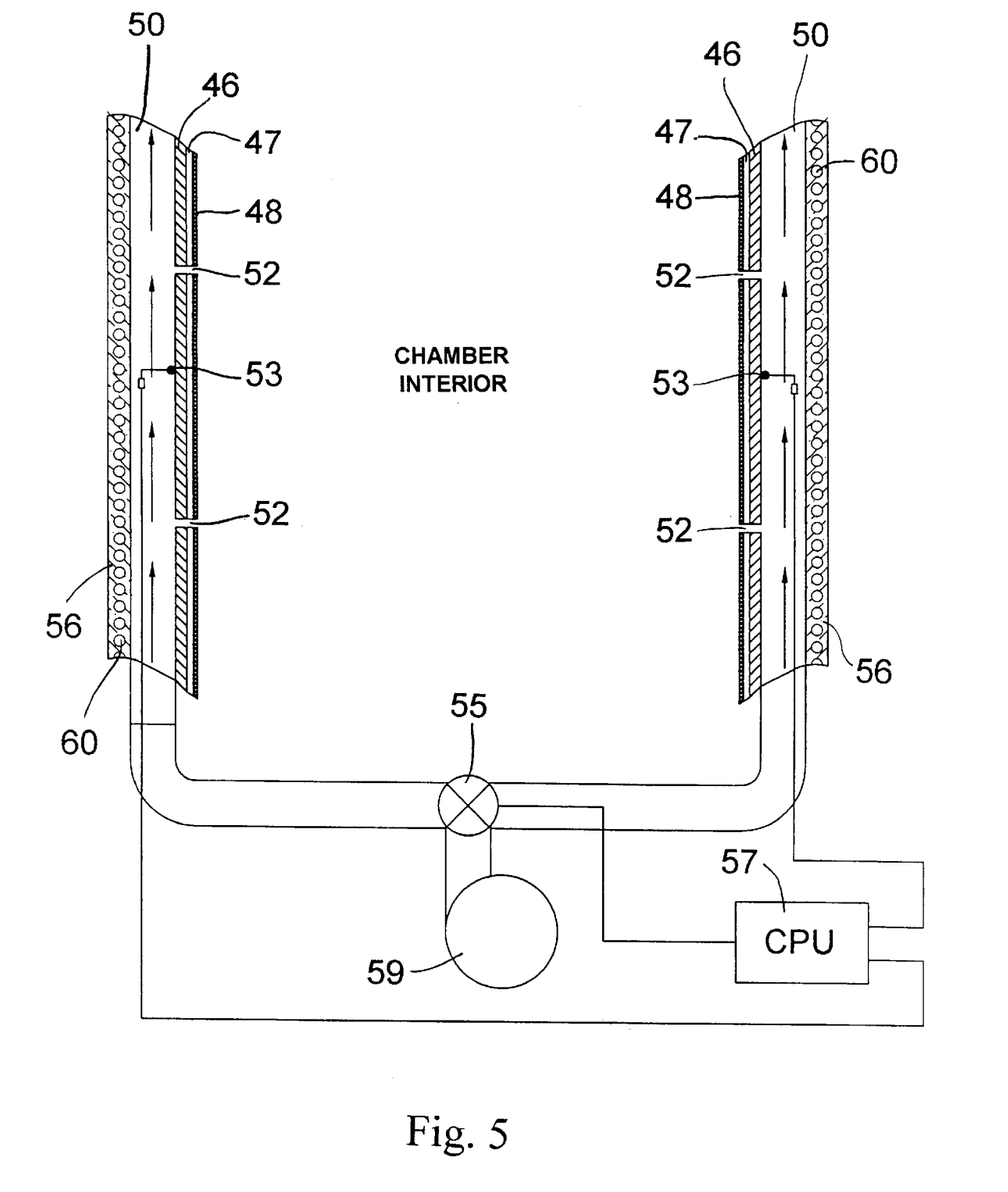
FIG. 5 is another section view of the wall structure with a diagrammatic cooling air control system.

In order to make the above described furnace as light-weight as possible, the walls of PSTC 12 and SCC 26 may be made of a construction illustrated in FIG. 4 or FIG. 5. The material facing the hot chamber interior is a layer of superalloy 46, such as a nickel based superalloy having good mechanical properties at high operating temperatures.

This superalloy may be coated on its hot surface facing the chamber interior by a thermal barrier coating (TBC) 48, such as a zirconia based TBC. Between the superalloy 46 and the TBC 48 there may be provided a bond coat 47 made of a corrosion and oxidation resistant material such as a cobalt-nickel-chromium-aluminum based alloy. This combination constitutes the inner wall structure of the furnace and is followed by a thin gap 50 used for controlled cooling of the wall structure and to feed air or oxygen to both the PSTC and SCC chamber interiors, which is fed through orifices 52 provided in the inner wall. Also, by providing, for example, a variable speed and/or volume of air passing through the gap 50, one can achieve a dynamic cooling control for the inner wall 46. Thus, for instance, as shown in FIG. 5, thermocouples 53 may be mounted on the cool face of the inner wall 46 to measure the temperature of said wall on a continuous basis and the cooling air passing through the gap 50 may be varied by controlling valve 55 with controller CPU 57 so that cooling air blown by blower 59 will maintain said inner wall 46 at a predetermined temperature. The second part of the wall construction shown in FIG. 4 comprises a ceramic fiber insulating material 54 on a steel shell 56. Several layers of the insulating material 54 may be provided. The air or oxygen passing in the gap 50, as shown by the arrows, cools both the superalloy wall 46 and the ceramic fiber insulation 54; thus it becomes hot before penetrating into the chamber interior through orifices 52, thereby increasing the thermal efficiency of the chamber. The insulating material 54 is optional and may be omitted as shown in FIG. 5.

It may also be desirable to cool the outer shell 56 if it is still too hot. Preferably this shell should be at a temperature such that it would not burn the skin when touched. This can be accomplished by water cooling the outer shell 56 by providing, for example, a passage 60 within this shell 56 and running water therein or by providing an outer enclosure (not shown) in which water can be circulated.

The entire depth or thickness D of the novel wall construction will normally be in the order of 4 inches (10 cm), which compares very favourably with typical conventional refractory liners of 12 inches (30 cm) thickness.

Using the wall construction illustrated in FIG. 4 or FIG. 5 the furnace shown in FIGS. 1 and 2 would weigh about 5,000 lb (2,250 kg), including the vibratory pan conveyer and the plasma torches in addition to the weight of the PSTC and SCC themselves. Adding to this the weight of the power supplies and other units such as controller, etc, the total weight of the system would be about 11,000 lb (5,000 kg) and it would be capable of processing 183 lb/hr (82 kg/hr) of wastes. Obviously larger waste processing capacities would require larger and heavier units, however, it has been calculated that, for example, a capacity of 676 lb/hr (300 kg/hr) would require a system weighing less than 20,000 lb (9,000 kg) which would be considerably lighter than anything presently known for such capacity. Obviously, smaller capacities would be satisfied with smaller size and weight systems designed in accordance with this invention.

It should be understood that many modifications obvious to those skilled in the art may be made without departing from the spirit and scope of the present invention.

What is claimed is:

1. A lightweight compact furnace for the treatment of wastes which comprises:
   (a) a primary solid treatment chamber containing a crucible in which the wastes are transformed into molten slag and volatile compounds;
   (b) a secondary combustion chamber for treating said volatile compounds generated in the primary solid treatment chamber to insure complete combustion of said volatile compounds;
   (c) a slag processing and storing chamber for cooling and transporting the slag formed in the crucible of the primary solid treatment chamber and for removal of the slag from the furnace; and
   (d) wherein the walls of said primary solid treatment chamber and of said secondary combustion chamber comprise an inner wall structure made of a metal retaining desired mechanical properties at the furnace operating temperatures, one side of said inner wall structure facing a hot chamber interior and the other side of said inner wall structure having a gap, means for blowing cooling air through the gap, and means adapted for controlling the cooling air passing through said gap so as to maintain said inner wall structure at a predetermined temperature during operation of the furnace, said walls also having an outer steel shell following said gap.

2. A furnace according to claim 1, in which the crucible is tiltable and vertically movable so that the crucible may be periodically lowered from a position within the primary solid treatment chamber to a position in the slag processing and storing chamber where the crucible is tilted to pour the molten slag into molds in which said slag solidifies and from which the slag is removed in the form of ingots.

3. A furnace according to claim 2 in which the molds are made from two separable halves which may be pulled apart to free the slag ingots.

4. A furnace according to claim 2, in which a compensated load cell is provided to control the weight of the ingot in each mold.

5. A furnace according to claim 1, in which the crucible is stationary and has an induction plug at its bottom for pouring the molten slag into molds located in the slag processing and storing chamber such that the slag is solidified and formed into ingots upon removal.

6. A furnace according to claim 1, wherein the furnace comprises a plasma torch for heating the wastes in the crucible to a temperature above 2,800° F. (1,540° C.), for vaporizing any water contained in said wastes, for dissociating any organics in said wastes into molecules, and for mixing and melting inorganic components in said wastes into slag.

7. A furnace according to claim 6, in which said plasma torch is capable of operating in a transferred mode as well as a non-transferred mode.

8. A furnace according to claim 1, in which an induction coil is provided to heat the wastes in the crucible to a temperature above 2,800° F. (1,540° C.), thereby vaporizing any water contained in said wastes, dissociating any organics in the wastes into molecules, and mixing and melting any inorganic components in the wastes into slag.

9. A furnace according to claim 1, in which said crucible is water-cooled.

10. A furnace according to claim 1, in which said crucible is air-cooled.

11. A furnace according to claim 1, in which a plasma torch is provided to maintain the secondary combustion chamber at a temperature of about 2,000° F. (1,095° C.).

12. A furnace according to claim 1, wherein the furnace comprises a passage between the primary solid treatment chamber and the secondary combustion chamber through which the volatile compounds generated in the primary solid treatment chamber pass to the secondary combustion chamber for further treatment, said passage comprising a high temperature arrester for preventing any oversized particles entrained in the volatile compounds from leaving the primary solid treatment chamber.

13. A furnace according to claim 1, in which the slag processing and storing chamber has a slag cooling section with water-cooled walls.

14. A furnace according to claim 13, in which said slag cooling section also has a water-cooled bottom.

15. A furnace according to claim 1, wherein the furnace comprises thermocouples mounted on a side of the inner wall structure facing the gap through which air is passed to cool said wall structure, the thermocouples being mounted for measuring the temperature of said inner wall and comprising means for relaying the temperature measurements to a controller which controls a valve that thereby allows sufficient cooling air into the gap to maintain said temperature at a predetermined value.

16. A furnace according to claim 1, in which orifices are provided in said inner wall structure to allow air to be injected through said orifices into the primary solid treatment chamber and/or the secondary combustion chamber to be used as process air therein.

17. A furnace according to claim 1, wherein the furnace comprises at least one layer of a ceramic fiber insulating material between the gap and the outer steel shell.

18. A furnace according to claim 1, in which the outer steel shell is water-cooled.

19. A furnace according to claim l, wherein the primary solid treatment chamber and the secondary combustion chamber comprise a single vessel.

20. A furnace according to claim 1, which has a modular construction.

21. A lightweight wall for a furnace having an interior facing a hot chamber in the furnace, the wall comprising an inner wall structure made of a metal retaining desired mechanical properties at furnace operating temperatures, one side of said inner wall structure facing the hot chamber interior, and the other side of said inner wall structure having a gap, means connected to said gap for passing cooling air through the gap, and means adapted for controlling the cooling air passing through the gap to produce a dynamic controlled cooling of said inner wall structure, the gap being followed by an outer steel shell.

22. A lightweight wall according to claim 21, in which the inner wall structure is made of a superalloy layer, a thermal barrier coating facing the hot chamber interior and a bond coat providing bonding between said superalloy layer and said thermal barrier coating.

23. A lightweight wall according to claim 22, in which the superalloy layer is a layer of a nickel based superalloy.

24. A lightweight wall according to claim 22, in which the thermal barrier coating is a zirconia based thermal barrier coating.

25. A lightweight wall according to claim 22, in which the bond coat is a CoNiCrAlY bond coat.

26. A lightweight wall according to claim 22, in which the thermal barrier coating and the bond coat do not exceed 0.08 inch (0.2 cm) in total thickness.

27. A lightweight wall according to claim 21, which comprises said inner wall structure having orifices to allow air passing through the gap to also penetrate into the hot chamber interior, to be used as process air therein.

28. A lightweight wall according to claim 21, in which between the wall structure and the outer steel shell, there is also provided at least one layer of a ceramic fiber insulating material.

29. A lightweight wall according to claim 21, in which the outer steel shell is water-cooled.

* * * * *